United States Patent
Kato

(10) Patent No.: US 9,855,932 B2
(45) Date of Patent: Jan. 2, 2018

(54) PARKING AND STOPPING CONTROL SYSTEM

(75) Inventor: Hideki Kato, Machida (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 13/575,502

(22) PCT Filed: Jan. 29, 2010

(86) PCT No.: PCT/JP2010/051291
§ 371 (c)(1),
(2), (4) Date: Jul. 26, 2012

(87) PCT Pub. No.: WO2011/092857
PCT Pub. Date: Aug. 4, 2011

(65) Prior Publication Data
US 2012/0303233 A1    Nov. 29, 2012

(51) Int. Cl.
*B60T 7/12*    (2006.01)
*B60T 13/74*    (2006.01)

(52) U.S. Cl.
CPC .......... *B60T 7/12* (2013.01); *B60T 13/74* (2013.01); *B60T 2201/06* (2013.01); *B60T 2201/10* (2013.01)

(58) Field of Classification Search
CPC .......... B60T 7/12; B60T 13/74–13/748; B60T 2201/06; B60T 2201/10; B60T 2270/82; B60T 2270/89
USPC ..................................... 701/36, 70; 188/382
See application file for complete search history.

(56) References Cited

U.S. PATENT DOCUMENTS

| 6,650,999 B1* | 11/2003 | Brust et al. ............... 701/517 |
| 2008/0086253 A1* | 4/2008 | Nakayama ............ B60T 7/122 701/80 |
| 2009/0124457 A1* | 5/2009 | Nitta et al. ................... 477/93 |

FOREIGN PATENT DOCUMENTS

| DE | 100 61 007 A1 | 6/2002 |
| DE | 10 2007 001 708 | 7/2008 |
| DE | 10 2008 024 019 | 11/2009 |
| JP | 59 140152 | 8/1984 |

(Continued)

OTHER PUBLICATIONS

Audi A4 Owner's Manual, 2007, pp. 121-125.*
Audi A4 Owner's Manual, 2007.*

*Primary Examiner* — Spencer D Patton
(74) *Attorney, Agent, or Firm* — Oblon, McClelland, Maier & Neustadt, L.L.P.

(57) ABSTRACT

A parking and stopping control system includes a park maintaining device configured to maintain a parked state; a park maintaining control device configured to control the park maintaining device to maintain the parked state; a parking temporary determining device capable of making a temporary determination that there is a possibility an own vehicle will be parked; and an intention determining device configured to determine an intention of a driver, wherein when the temporary determination is made, the park maintaining control device controls the park maintaining device to execute a maintaining control of the parked state if an intention of the driver is an intention to park, and the park maintaining control device prohibits the maintaining control of the parked state if the intention of the driver is not the intention to park.

8 Claims, 5 Drawing Sheets

(56) References Cited

FOREIGN PATENT DOCUMENTS

| JP | 2005 280640 | 10/2005 |
| JP | 2006 137218 | 6/2006 |
| JP | 2009 113712 | 5/2009 |
| JP | 2009 190551 | 8/2009 |

* cited by examiner

PARKING AND STOPPING CONTROL SYSTEM

FIELD

The present invention relates to a parking and stopping control system for controlling a parked state and a stopped state of a vehicle.

BACKGROUND

A stop maintaining device for maintaining a stopped state regardless of whether the operation of a brake pedal is made by a driver is conventionally known. For instance, patent literature 1 discloses a technique of operating the stop maintaining device (braking force generating means) to maintain the stopped state if a change in the position of the driver is detected when the vehicle is stopped and the brake pedal is depressed. Patent literature 1 also discloses a technique of not executing the stop maintaining control if a predetermined condition is met when determining whether or not to carry out the control. Thus, the execution of the stop maintaining control that goes against the intention of the driver is prohibited when the vehicle advancing direction is backward direction and the seat belt is not fastened, for example, and the driver can intentionally creep travel the vehicle.

A park maintaining control device for determining that an own vehicle will be parked when a predetermined condition is met, and operating a park maintaining device to maintain a parked state is known. For instance, patent literature 2 discloses a device providing with a so-called EPB (Electric Parking Brake) serving as a park maintaining device.

CITATION LIST

Patent Literature

Patent Literature 1: Japanese Patent Application Laid-open No. 2009-113712
Patent Literature 2: Japanese Patent Application Laid-open No. 2009-190551

SUMMARY

Technical Problem

The conventional park maintaining control device determines that the own vehicle will be parked when the stop maintaining control is continuously performed for a predetermined time with a foot removed from the brake pedal. Therefore, when the condition is met, the park maintaining control device controls the park maintaining device and generates the braking force to maintain the parked state. However, the intention of the driver is not reflected on such condition at all. Thus, the park maintaining control may be executed against the intention of the driver, in which case, the driver needs to carry out an operation to release the unnecessary park maintaining control that may become troublesome. The driver may not recognize that the park maintaining control is being executed, and confusion may arise by the unintended releasing operation and the like if recognized for the first time when starting the vehicle.

It is an object of the present invention to improve the drawbacks of the conventional examples and to provide a parking and stopping control system configured so that the park maintaining control that goes against the intention of the driver is not performed.

Solution to Problem

In order to achieve the above mentioned object, a parking and stopping control system according to the present invention includes a park maintaining device configured to maintain a parked state; a park maintaining control device configured to control the park maintaining device to maintain the parked state; a parking temporary determining device configured to make a temporary determination that there is a possibility an own vehicle will be parked when a parking condition that is an executable condition of a maintaining control of the parked state is met, an intention confirming information transmitting device configured to transmit intention confirming information to the driver to confirm the intention to park when the temporary determination is made; and an intention determining device configured to determine an intention of a driver, wherein if it is determined as the intention to park of the driver with an operation of the driver on an intention expressing device after the intention confirming information transmitting device outputs the intention confirming information, and the park maintaining control device prohibits the maintaining control of the parked state if the intention of the driver is not the intention to park.

In order to achieve the above mentioned object, a parking and stopping control system according to the present invention includes a stop maintaining device configured to maintain a stopped state; a park maintaining device configured to maintain a parked state; a stop maintaining control device configured to control the stop maintaining device to maintain the stopped state when a vehicle is stopped; a park maintaining control device configured to control the park maintaining device to maintain the parked state; a parking temporary determining device configured to make a temporary determination that there is a possibility of an own vehicle will be parked when a parking condition that is an executable condition of a maintaining control of the parked state is met, and an intention confirming information transmitting device configured to transmit intention confirming information to the driver to confirm the intention to park when the temporary determination is made; and an intention determining device configured to determine an intention of a driver, wherein if it is determined as the intention to park of the driver with an operation of the driver on an intention expressing device after the intention confirming information transmitting device outputs the intention confirming information during the maintaining control of the stopped state, and the park maintaining control device prohibits the maintaining control of the parked state if the intention of the driver is not the intention to park.

Here, it is desirable that the intention determining device determines that the intention of the driver is not the intention to park if a brake operation of the driver is performed.

Further, it is desirable that if the intention of the driver is not the intention to park, the intention determining device again determines the intention of the driver after elapse of a predetermined time.

Further, it is desirable that if the intention of the driver is not the intention to park, the intention determining device determines necessity of redetermination of the intention of the driver, and the intention of the driver again being determined after elapse of a predetermined time if it is determined that redetermination is necessary.

Further, it is desirable that if the maintaining control of the parked state is being executed, the park maintaining control device releases the maintaining control of the parked state if the temporary determination is not made and the intention of the driver is the intention to release the maintaining control of the parked state.

Advantageous Effects of Invention

A parking and stopping control system according to the present invention executes the park maintaining control if the intention to park of the driver is confirmed but does not execute the park maintaining control if the intention to park is not confirmed. Thus, the parking and stopping control system can relieve the driver from the trouble of releasing the unnecessary park maintaining control through manual operation at the time of starting since the unnecessary park maintaining control that goes against the intention of the driver is not executed. Further, the parking and stopping control system can prevent confusion of operations at the time of starting since the releasing operation of the unknowingly executed park maintaining control does not need to be carried out at the time of starting.

DESCRIPTION OF EMBODIMENTS

Hereinafter, embodiments of a parking and stopping control system according to the present invention will be described in detail based on the drawings. It should be noted that the present invention is not to be limited by such embodiments.

Embodiment

An embodiment of a parking and stopping control system according to the present invention will be described based on FIGS. 1 to 5.

Figure 1:
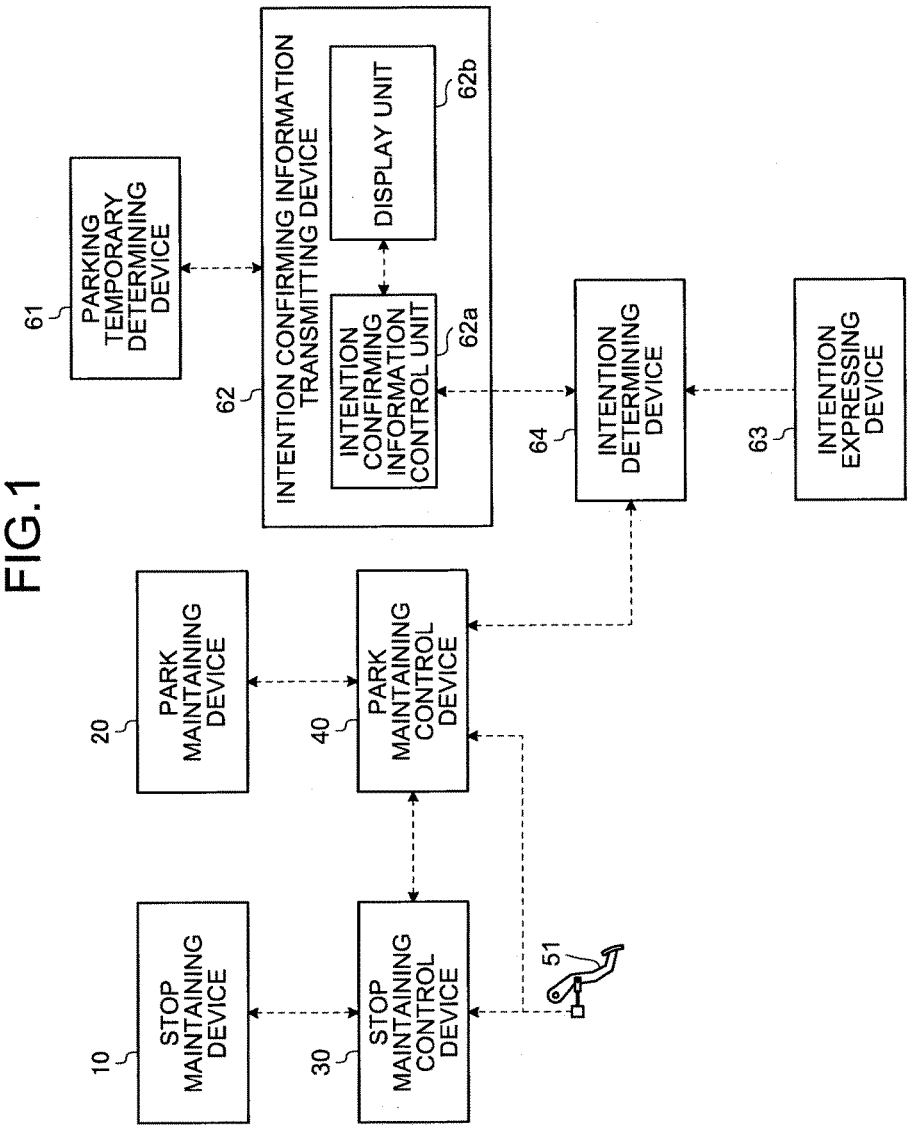
FIG. 1 is a block diagram illustrating a configuration of a parking and stopping control system according to the present invention.

First, a configuration of the parking and stopping control system of the present embodiment will be described based on FIG. 1.

First, the parking and stopping control system includes a stop maintaining device 10 for maintaining a stopped state of a vehicle, a park maintaining device 20 for maintaining a parked state of the vehicle, a stop maintaining control device 30 for controlling the stop maintaining device 10 to maintain the stopped state, and a park maintaining control device 40 for controlling the park maintaining device 20 to maintain the parked state.

The stop maintaining device 10 is a device having a so-called brake hold function so as to be able to maintain the stopped state. A braking force generating device of the vehicle, for example, may be used for the stop maintaining device 10. The braking force generating device includes an electric or hydraulic actuator for controlling the magnitude of the braking force. For instance, the stop maintaining device 10 of the present embodiment includes a braking force generating unit such as a caliper or a rotor in each wheel, and an actuator for adjusting the brake oil pressure in the braking force generating unit.

If the stop maintaining device 10 is configured as above, the stop maintaining control device 30 controls the actuator and causes the wheel to generate the braking force to carry out the stop maintaining control. For instance, a stop maintaining control switching unit such as a change-over switch for enabling the driver to switch between execution and non-execution of the stop maintaining control is arranged in a vehicle compartment. The stop maintaining control device 30 executes the stop maintaining control when a predetermined stop maintaining condition is met if in a stop maintaining control ON state in which a control ON signal is received from the stop maintaining control switching unit. The stop maintaining condition is when the vehicle is stopped in the stop maintaining control ON state, for example. The stop maintaining control device 30 controls the stop maintaining device 10 to maintain the stopped state when the vehicle comes to a stop with the depressing operation of a brake pedal 51 of the driver in the stop maintaining control ON state. The vehicle thus can maintain the stopped state even if the driver removes the foot from the brake pedal 51. The stop maintaining control device 30 releases the stop maintaining control and enables the vehicle to start when, for example, the driver carries out an acceleration operation during the stop maintaining control.

A representative example of the park maintaining device 20 is a so-called electrical parking brake. The park maintaining device 20 may have a configuration dedicated to the present device, where the braking force generating device of the vehicle may be used similar to the stop maintaining device 10. For instance, the park maintaining device 20 having a dedicated configuration may include the braking force generating unit including a so-called drum brake device, and an electrical or hydraulic actuator for operating a friction member (brake shoe) of the braking force generating unit.

The park maintaining control device 40 controls the actuator of the park maintaining device 20, and causes the wheel to generate the braking force to carry out the park maintaining control. For instance, a park maintaining control switching unit such as a change-over switch for enabling the driver to switch between execution and release of the park maintaining control is arranged in a vehicle compartment. The park maintaining control device 40 executes the park maintaining control when receiving a control execution signal from the park maintaining control switching unit, and releases the park maintaining control being executed when receiving a control release signal. The park maintaining control device 40 may execute or release the park maintaining control in cooperation with a position of a shift lever of a transmission. For instance, when an automatic mode is selected, the park maintaining control device 40 executes the park maintaining control if the position of the shift lever is a park position "P", and releases the park maintaining control if the shift lever is operated from the park position "P" to a drive position "D", for example.

The intention of the driver to park or start is reflected on the switching to the execution or the release of the park maintaining control if at the time of the operation of the park maintaining control switching unit or the shift lever. However, there was a situation where the park maintaining control is executed regardless of the intention of the driver in the conventional parking and stopping control system. For instance, when the stop maintaining control is executed continuously for a predetermined time without the brake pedal 51 being depressed, for example, determination is made that the own vehicle will be parked and the park maintaining control is executed regardless of reasons such as with what intention the driver stopped the vehicle or with what intention the driver removed the foot from the brake pedal 51. Therefore, in the conventional art, there is a possibility that the park maintaining control may be executed although the vehicle is temporarily stopped to take out a luggage in the vehicle compartment or to make a phone call, for example, and is to be started immediately afterwards, and hence the releasing operation of the park maintaining control switching unit is forced when starting. The park maintaining control is also executed when detecting information presumed that the own vehicle will be parked. This information includes a signal indicating the driver getting off (signal indicating non-fastening of the seat belt of the driver seat, signal indicating opening of the door of driver seat, etc.). However, the seat belt may be unfastened when getting the luggage from the back seat, in particular, in the vehicle compartment, where the park maintaining control may be executed simply when the seat belt is unfastened even if the driver does not have the intention to park in the conventional art.

In the present embodiment, the stop maintaining control and the park maintaining control reflecting the intention of the driver is to be executed.

First, in the conventional art, determination is made that the own vehicle will be parked if a predetermined parking condition such as the continuing time of the stop maintaining control or the reception of a signal indicating the driver getting off the vehicle is met, and the park maintaining control is executed. In the present embodiment, on the other hand, temporary determination is made that there is a possibility the own vehicle will be parked when the parking condition is met, and the park maintaining control is not executed until the actual determination that the own vehicle will be parked is made. Thus, the parking and stopping control system of the present embodiment includes a parking temporary determining device 61 capable of making a temporary determination (hereinafter referred to as "parking temporary determination") that there is a possibility the own vehicle will be parked. The parking temporary determination is made when a predetermined parking condition similar to the conventional art is met. The parking temporary determination is carried out when the driver's foot is removed from the brake pedal 51 and the vehicle is stopped.

The parking and stopping control system of the present embodiment includes an intention confirming information transmitting device 62 for transmitting to the driver information (hereinafter referred to as "intention confirming information") for confirming the intention of the driver. The intention confirming information is for confirming the intention to park to the driver. The intention confirming information uses that which stimulates vision, hearing, or both of them of the driver. For instance, the visual information may be character information, figure information, and the like that indicates intention or no-intention of parking. The intention confirming information transmitting device 62 in this case includes a display unit for displaying the intention confirming information. The display unit may be a measuring instrument display unit of a speed meter or the like, a monitor of a car navigation system or a multi-information system, and the like. On the other hand, the hearing information may be audio information, acoustic information and the like that indicates the intention or no-intention of parking. The intention confirming information transmitting device 62 includes an intention confirming information control unit 62a for outputting the intention confirming information when the parking temporary determination is made. The intention confirming information control unit 62a of the present embodiment outputs the intention confirming information to a display unit 62b as the visual information, and confirms the intention to park to the driver.

The parking and stopping control system of the present embodiment also includes an intention expressing device 63 for enabling the driver to express his/her intention, and an intention determining device 64 for determining the intention of the driver based on the information by the intention expressing device 63.

The intention expressing device 63 is operated by the driver who obtained the intention confirming information. The intention expressing device 63 may be an operating unit such as a switch arranged in a vehicle compartment, for example. In the case of such configuration, the operating unit is operated by the driver if there is intention to park. The intention determining device 64 determines that the driver has the intention to park when receiving an ON signal involved in the operation of the operating unit. The intention expressing device 63 may use a monitor such as a touch panel as having a similar configuration. In this case, the intention expressing device 63 and the intention confirming information transmitting device 62 can be integrated, and it can be realized by displaying the switch near the intention confirming information on the monitor, for example. The driver pushes the switch on the monitor if intending to park to transmit the ON signal to the intention determining device 64.

Figure 2:
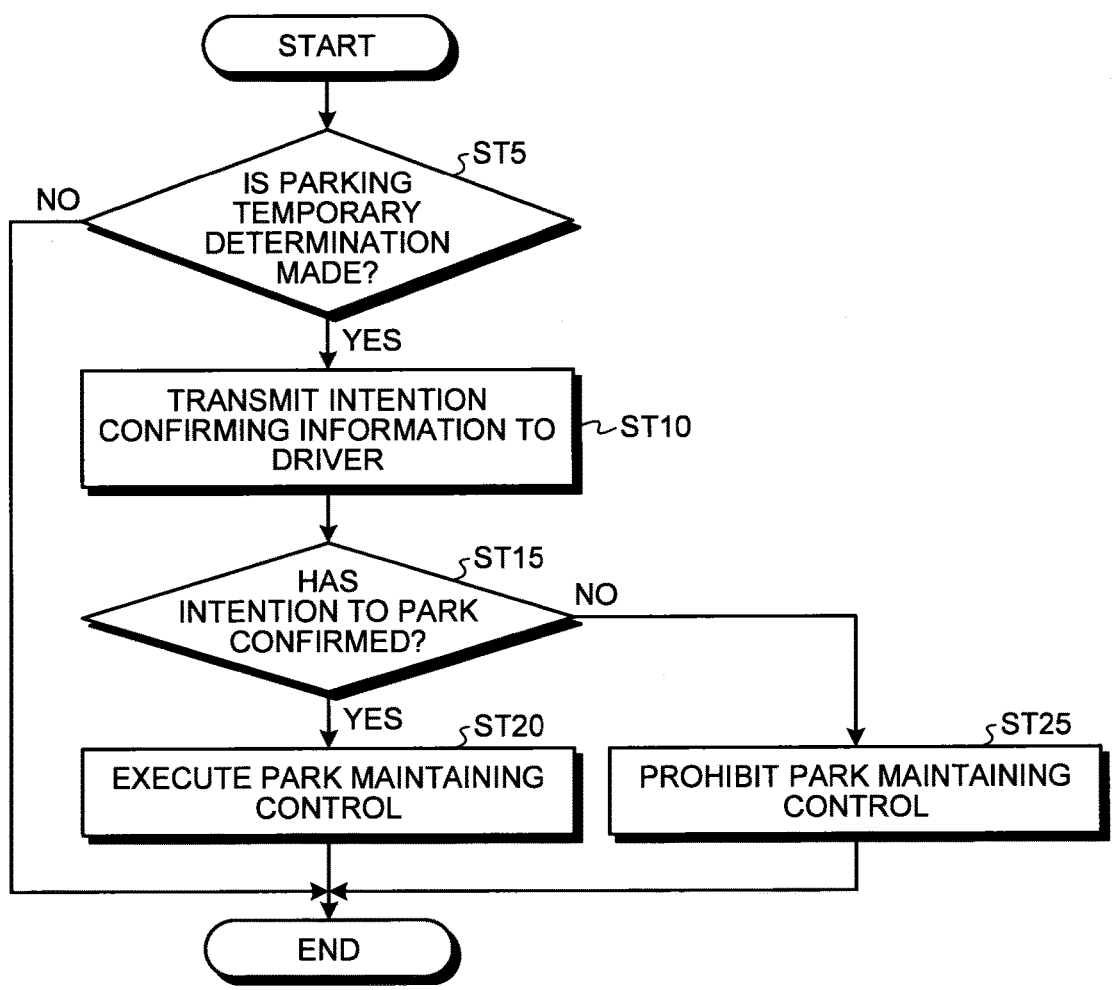
FIG. 2 is a flowchart illustrating one embodiment of the operation of the parking and stopping control system according to the present invention.

The operation of the execution determination of the park maintaining control in the parking and stopping control system will be hereinafter described using the flowchart of FIG. 2.

In the parking and stopping control system, whether or not the parking temporary determination is made is determined (step ST5). The present operation is terminated if the parking temporary determining device 61 does not perform the parking temporary determination, but the operation proceeds to the next operation if the parking temporary determination is made. If the parking temporary determination is made, the parking temporary determining device 61 sends a command to the intention confirming information transmitting device 62 to transmit the intention confirming information. The parking temporary determination is carried out during the stop maintaining control with the driver's foot removed from the brake pedal 51.

The intention confirming information transmitting device 62 displays on the display unit 62b the intention confirming information for the intention confirming information control unit 62a to confirm the intention or no-intention of parking, and transmits the intention confirming information to the driver (step ST10). The driver then carries out the operation of the intention expressing device 63 if intending to park.

The intention determining device 64 determines whether or not the driver has the intention to park in accordance with whether or not the ON signal from the intention expressing device 63 is received (step ST15). The intention determining device 64 sends the determination result to the park maintaining control device 40.

If the ON signal is received and the intention of the driver to park is confirmed in step ST15, the park maintaining control device 40 switches the parking temporary determination to the actual determination that the own vehicle will be parked, and executes the park maintaining control (step ST20). The park maintaining control device 40, on the other hand, prohibits the execution of the park maintaining control (step ST25) if the ON signal is not received and the intention of the driver to park is not confirmed in step ST15.

Therefore, in the parking and stopping control system, the park maintaining control is executed when the driver expresses the intention to park. Thus, the parking and stopping control system can avoid the execution of the park maintaining control that goes against the intention of the driver, where there are not troubles in starting the vehicle and the confusion in the operations at the time of starting can be prevented as the driver is not forced to perform the releasing operation of the park maintaining control switching unit for releasing the unnecessary park maintaining control. For instance, if the stopped state is based on waiting for the railroad crossing, waiting at the stop lights, and the like, there is no intention to park and the subsequent starting is desired. The parking and stopping control system does not execute the park maintaining control in accordance with the intention of the driver in such a case, so that the driver can smoothly operate to start the vehicle.

The intention expressing device 63 configured as above has high exclusive use degree, and thus has a possibility the cost may increase. The existing intention expressing device 63 is thus preferably used. For instance, since the vehicle is already stopped and the foot of the driver is removed from the brake pedal 51 when the parking temporary determination is made, an apparent change does not appear in the vehicle other than that the stop lamp (not illustrated) is turned ON. Therefore, a device for outputting a signal in accordance with the depression of the brake pedal 51 may be used for the intention expressing device 63. The intention expressing device 63 in this case may be a sensor, a stop lamp switch, or the like for detecting the pedal operation amount such as the pedal depressing force. In this case, the intention determining device 64 determines that the driver does not have the intention to park when receiving such signal.

Figure 3:
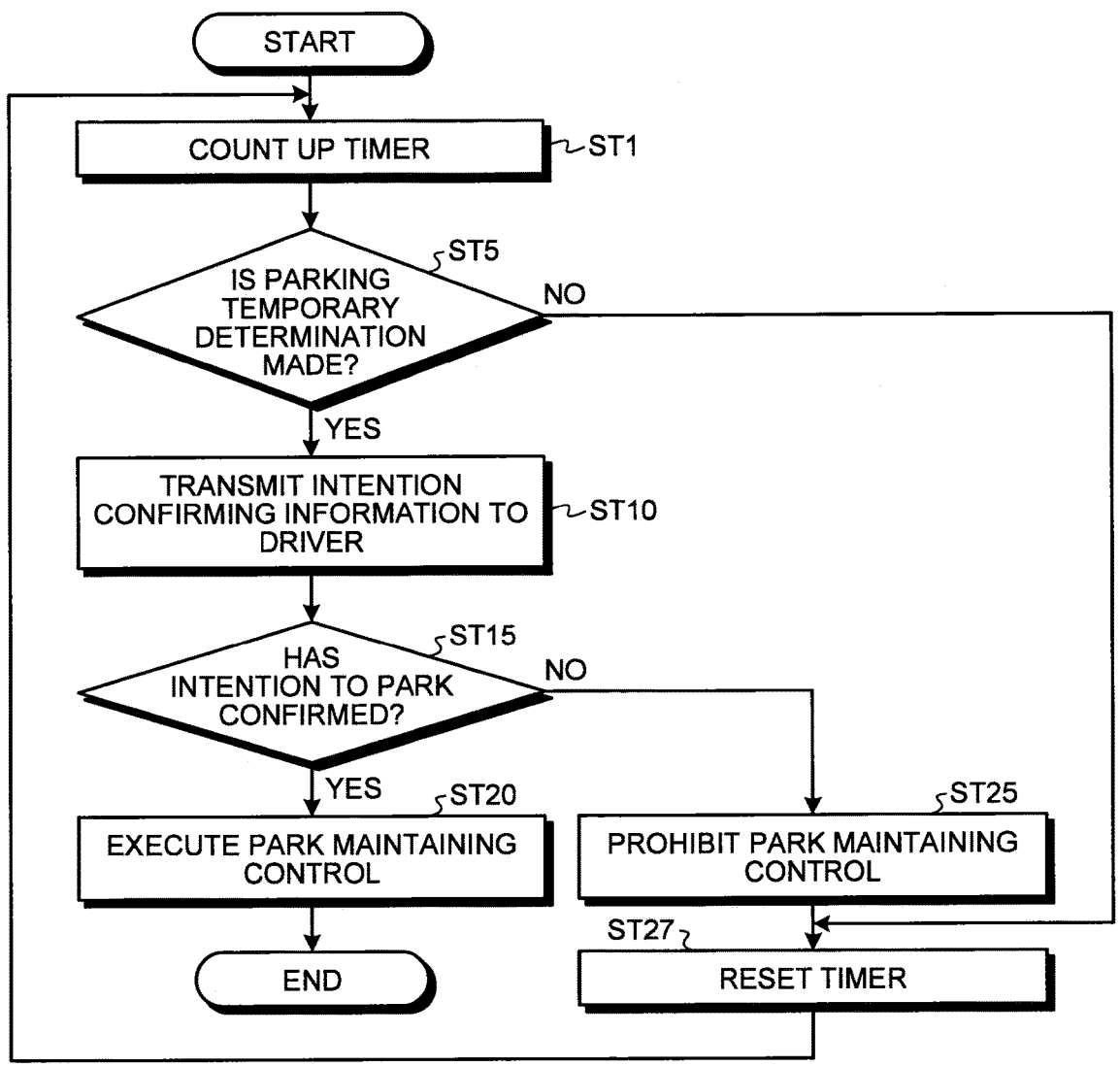
FIG. 3 is a flowchart illustrating another embodiment of the operation of the parking and stopping control system according to the present invention.

The driver may also desire to park after once expressing there is no intention to park. To respond to such case, the parking and stopping control system desirably executes the operation of FIG. 2 repeatedly. For instance, as illustrated in the flowchart of FIG. 3, after counting up a timer for a predetermined time with the stopping of the vehicle as a trigger (step ST1), the process proceeds to step ST5 to determine whether the parking temporary determination is made. The subsequent operations are executed, the timer is reset (step ST27) when the execution of the park maintaining control is prohibited in step ST25, and the timer is again counted up in step ST1. Therefore, the parking and stopping control system can repeatedly confirm the intention to park to the driver for every elapse of a constant time. Thus, the parking and stopping control system can reflect the intention of the driver and shift to the park maintaining control even when once negating the intention to park and then desiring to maintain the parked state. The steps common in the flowcharts of FIGS. 2 and 3 comply with the contents described with FIG. 2.

If a signal output device corresponding to the depressing of the brake pedal 51 is used for the intention expressing device 63, the parking temporary determination is not made unless the driver again removes the foot from the brake pedal 51 in step ST5 after the second round in FIG. 3. Thus, the present operation will be terminated with the flowchart of FIG. 2, and the subsequent intention to park cannot be responded. If determined that the parking temporary determination is not carried out in step ST5 of FIG. 3, the process proceeds to step ST27 to reset the timer.

Figure 4:
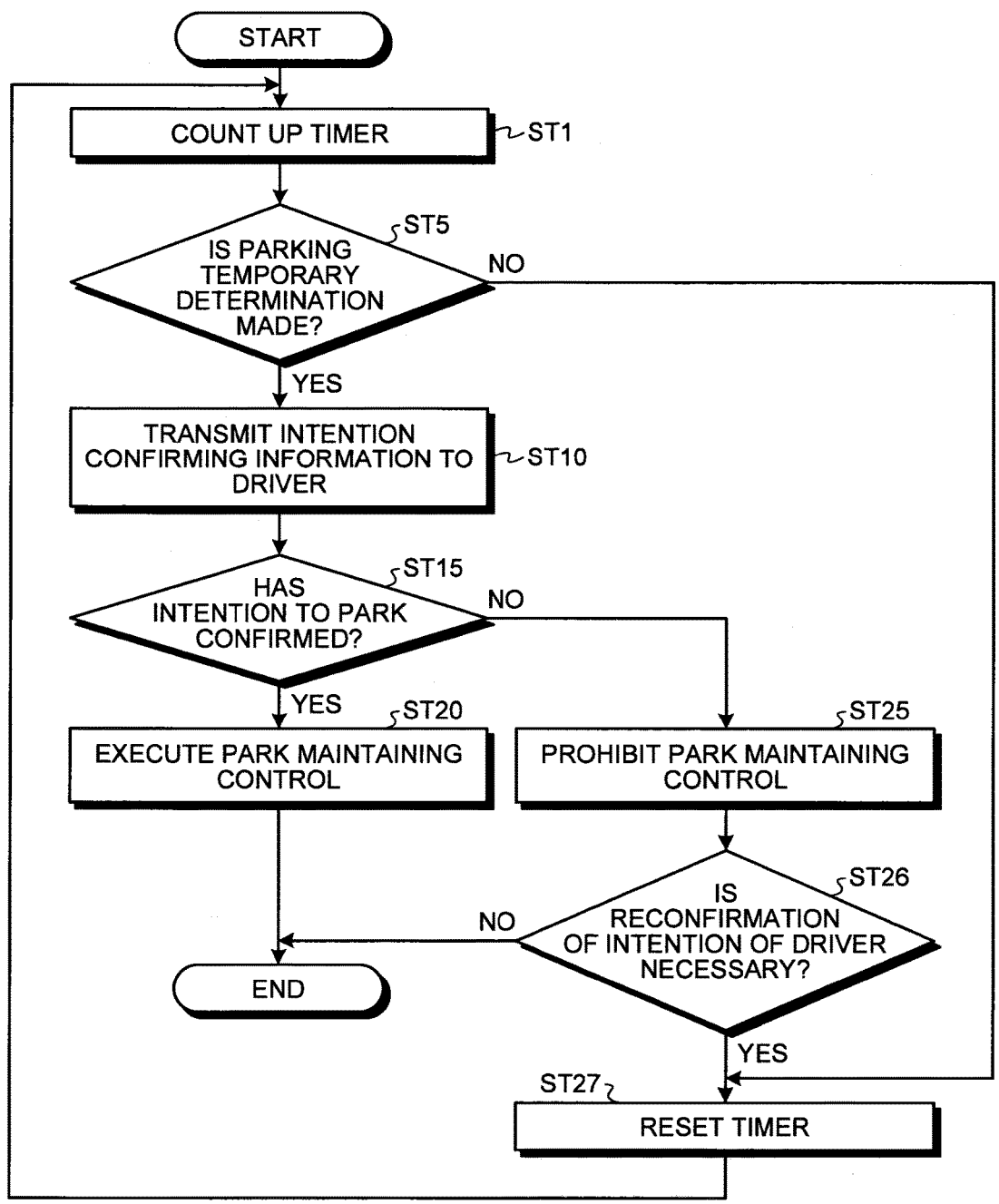
FIG. 4 is a flowchart illustrating another embodiment of the operation of the parking and stopping control system according to the present invention.

Furthermore, the driver may clearly deny or may not clearly deny the intention to park under a situation where the parking temporary determination is made. The case of clearly denying is a case where the vehicle waiting for the railroad crossing, waiting at the stop light, and the like is clearly to be started. The case of not clearly denying is a case of stopping the vehicle and intending to start the vehicle after running some errands, but then need to run errands outside the vehicle for example. Normally, the driver may temporarily remove the foot from the brake pedal 51 since the stop maintaining device 10 is mounted on the vehicle, but if the start of the vehicle is apparent, the brake pedal 51 is often stepped down in the stopped state. For instance, if the parking temporary determination is made when the foot is temporarily removed from the brake pedal 51, the driver has a high possibility of depressing the brake pedal 51 and maintaining the depressed state when the intention confirming information is conveyed. Therefore, if the depressing continuing time of the brake pedal 51 is longer than a predetermined time, for example, it can be said that the intention to park of the driver is clearly denied. When stopping the vehicle to finish the errands such as taking the luggage in the back seat, for example, the driver removes the foot from the brake pedal 51 but such operation and the depressing operation of the brake pedal 51 have a possibility of being repeated. Thus, if the repeating operation is carried out within a predetermined time, for example, after the intention confirming information is transmitted, the real intention of the driver cannot be clearly determined on the vehicle side even if the intention to park is denied by one brake depressing operation, and the intention of the driver is desirably reconfirmed as in the flowchart of FIG. 3. The intention of the driver is reconfirmed as illustrated in the flowchart of FIG. 4. The steps common in the respective flowcharts of FIGS. 2, 3, and 4 comply with the contents described in FIGS. 2 and 3.

The parking and stopping control system in this case causes the intention determining device 64 to determine whether or not reconfirming of the intention of the driver is necessary when the execution of the park maintaining control is prohibited in step ST25 (step ST26). This determination is executed based on the depressing form of the brake pedal 51 by the driver, for example. In step ST26, it can be said that the intention to park of the driver is clearly denied when the depressing continuing time of the brake pedal 51 is longer than a predetermined time (e.g., few seconds), and thus determination is made that the intention to park of the driver does not need to be reconfirmed in this case and the present operation is terminated. On the other hand, in step ST26, it is difficult to determine the real intention of the driver if the depressing of the brake pedal 51 is repeated within a predetermined time (e.g., count up time of timer), and thus determination is made that the intention to park of the driver needs to be reconfirmed when the number of times the brake pedal 51 is depressed within a predetermined time is greater than or equal to a predetermined number of times (number of times the intention to park cannot be clearly determined). In this case, the process proceeds to step ST27 to reset the timer, and the timer is again counted up in step ST1. In this case, the intention to park can be repeatedly confirmed with respect to the driver for every elapse of a constant time. Thus, the parking and stopping control system can avoid the execution of the unnecessary park maintaining control such as when waiting for railroad crossing, and the intention to park can be repeatedly confirmed with respect to the driver until the intention becomes clear when the real intention of the driver is obscure, so that the appropriate parking and stopping maintaining control corresponding to the situation of driving or the like and the intention of the driver can be executed.

Figure 5:
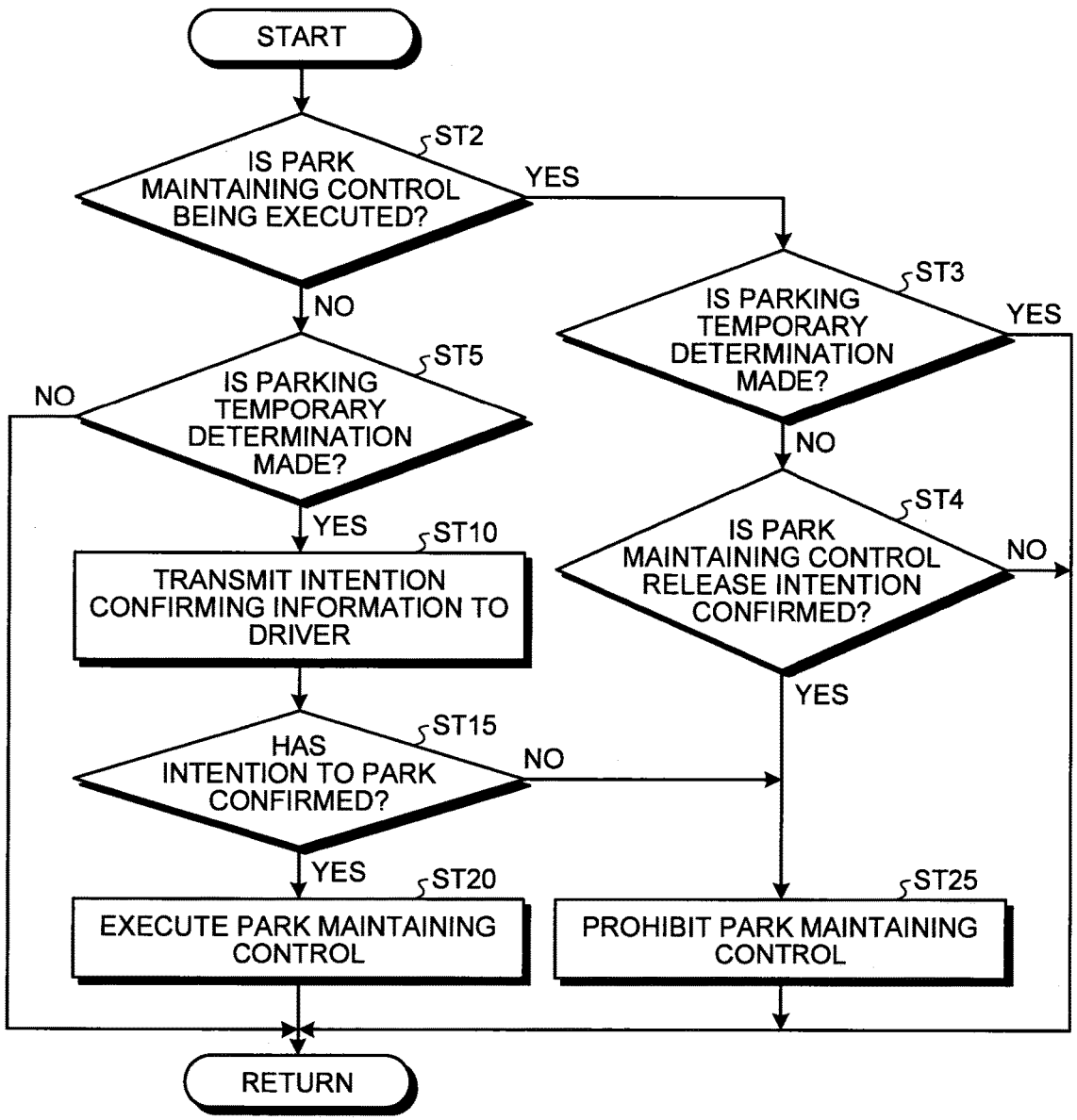
FIG. 5 is a flowchart illustrating another embodiment of the operation of the parking and stopping control system according to the present invention.

After expressing the intention to park, the driver may possibly reverse such intention. To respond to such case, the operation is to be carried out as illustrated in the flowchart of FIG. 5. The steps common in the respective flowcharts of FIGS. 2 and 5 comply with the contents described in FIG. 2.

Since the park maintaining control is executed once the driver expresses the intention to park, the parking and stopping control system in this case first determines whether or not the park maintaining control is being executed (step ST2), and proceeds to step ST5 if the park maintaining control is not being executed to determine whether the parking temporary determination is made. In this case, the operation is thereafter carried out the same way as with the flowchart of FIG. 2, but the process may return to step ST2 after executing the park maintaining control in step ST20 or after prohibiting the park maintaining control in step ST25.

In contrast, if determined that the park maintaining control is being executed in step ST2, whether or not the parking temporary determination is made is determined, similar to step ST5 (step ST3). Then, if the parking temporary determination is made in step ST3, the park maintaining control being executed is continued as is. On the other hand, if the parking temporary determination is not made in step ST3 (i.e., not met), there is a possibility that the driver is desiring to release the park maintaining control being executed, and thus causes the intention determining device 64 to determine whether or not the intention of the driver in this case is the intention to release the park maintaining control (step ST4). Similar to the determination of step ST15, this determination is carried out based on the information of the intention expressing device 63. For instance, the intention determining device 64 confirms that the driver has the intention to release the park maintaining control when the ON signal from the intention expressing device 63 is not received or when a signal associated with the depressing operation of the brake pedal 51 from the intention expressing device 63 is received. Therefore, when the intention to release the park maintaining control is confirmed, the process proceeds to step ST25 to cause the park maintaining control device 40 to prohibit the execution of the park maintaining control. In this case, therefore, the park maintaining control being executed can be released even if the driver does not carry out the releasing operation of the park maintaining control switching unit. Further, if the intention to release the park maintaining control is not confirmed in step ST4, the park maintaining control being executed is continued as is. Therefore, the parking and stopping control system has high convenience for the driver as the manual release of the park maintaining control is not required, and does not cause the park maintaining control being executed to be mistakenly released against the intention of the driver.

INDUSTRIAL APPLICABILITY

As described above, the parking and stopping control system according to the present invention is thus useful in suppressing the park maintaining control that goes against the intention of the driver.

REFERENCE SIGNS LIST

10 Stop Maintaining Device
20 Park Maintaining Device
30 Stop Maintaining Control Device
40 Park Maintaining Control Device
51 Brake Pedal
61 Parking Temporary Determining Device
62 Intention Confirming Information Transmitting Device
63 Intention Expressing Device
64 Intention Determining Device

The invention claimed is:

1. A parking and stopping control system comprising:
an electrical parking brake configured to maintain a parked state of a vehicle;
circuitry including a first device, a second device, a third device, a fourth device, and a fifth device; and
a display unit, wherein
the fourth device includes a braking force generating device configured to maintain a stopped state of the vehicle by controlling a magnitude of a braking force of the braking force generating device,
the fifth device is configured to control the fourth device to maintain the stopped state of the vehicle when the vehicle is stopped,
the first device is configured to control the electrical parking brake to maintain the parked state of the vehicle,
the second device is configured to make a temporary determination that there is a possibility an own vehicle will be parked when a parking condition is established,
the display unit is configured to transmit intention confirming information to prompt a driver to confirm the intention to park when the temporary determination is made,
the third device is configured to determine an intention of the driver to park,
during the maintaining control of the stopped state, when the driver operates an intention expressing device in response to the intention confirming information output by the display unit to confirm that the driver intends to park, the first device controls the electrical parking brake to maintain the parked state, and
when the driver operates the intention expressing device in response to the intention confirming information output by the display unit to confirm that the driver does not intend to park, the first device prohibits the electrical parking brake from maintaining the parked state.

2. The parking and stopping control system according to claim 1, wherein if the intention of the driver is not the intention to park, the third device again determines the intention of the driver after elapse of a predetermined time.

3. The parking and stopping control system according to claim 1, wherein if the intention of the driver is not the intention to park, the third device determines necessity of redetermination of the intention of the driver, and the intention of the driver is again determined after elapse of a predetermined time if it is determined that redetermination is necessary.

4. The parking and stopping control system according to claim 1, wherein if the maintaining control of the parked state is being executed, the first device releases the maintaining control of the parked state if the temporary determination is not made and the intention of the driver is the intention to release the maintaining control of the parked state.

5. The parking and stopping control system according to claim 1, wherein the second device is configured to make the temporary determination when a signal indicating the driver getting off is detected during the maintaining control of the stopped state.

6. The parking and stopping control system according to claim 1, wherein the third device controls the display unit to transmit the intention confirming information to the driver to confirm the intention to park when the second device makes the temporary determination.

7. The parking and stopping control system according to claim 1, wherein the intention confirming information refers to an information for confirming an intention of the driver to park the vehicle.

8. The parking and stopping control system according to claim 1, wherein if the driver does not operate the intention expressing device after the display unit outputs the intention confirming information so that it is not determined that the driver intends to park, the first device prohibits the electrical parking brake from maintaining the parked state without any operation by the driver.

* * * * *